United States Patent
Wei et al.

(10) Patent No.: US 8,022,947 B2
(45) Date of Patent: *Sep. 20, 2011

(54) SYSTEMS AND METHODS FOR IMAGING WAVEFORM VOLUMES

(75) Inventors: Kaihong Wei, Pearland, TX (US); Sean Spicer, Katy, TX (US)

(73) Assignee: Landmark Graphics Corporation, Houston, TX (US)

(*) Notice: Subject to any disclaimer, the term of this patent is extended or adjusted under 35 U.S.C. 154(b) by 1052 days.

This patent is subject to a terminal disclaimer.

(21) Appl. No.: 11/848,788

(22) Filed: Aug. 31, 2007

(65) Prior Publication Data

US 2008/0059074 A1 Mar. 6, 2008

Related U.S. Application Data

(60) Provisional application No. 60/824,334, filed on Sep. 1, 2006.

(51) Int. Cl.
*G06T 15/00* (2011.01)
(52) U.S. Cl. .................. 345/419; 345/424
(58) Field of Classification Search .......... 345/419–428
See application file for complete search history.

(56) References Cited

U.S. PATENT DOCUMENTS

| | | | |
|---|---|---|---|
| 4,359,766 A | 11/1982 | Waters et al. | |
| 4,467,461 A | 8/1984 | Rice | |
| 5,056,066 A | 10/1991 | Howard | |
| 5,148,494 A | 9/1992 | Keskes | |
| 5,432,751 A | 7/1995 | Hildebrand | |
| 5,630,034 A | 5/1997 | Oikawa et al. | |
| 5,734,384 A | 3/1998 | Yanof | |
| 5,781,194 A | 7/1998 | Ponomarev et al. | |
| 5,838,564 A | 11/1998 | Bahorich | |
| 5,892,732 A | 4/1999 | Gereztenkom | |
| 5,949,424 A | 9/1999 | Cabral et al. | |
| 6,049,759 A | 4/2000 | Etgen | |
| 6,078,869 A | 6/2000 | Gunasekera | |
| 6,138,075 A | 10/2000 | Yost | |
| 6,304,266 B1 * | 10/2001 | Li | 345/424 |
| 6,396,495 B1 | 5/2002 | Parghi et al. | |

(Continued)

FOREIGN PATENT DOCUMENTS

EP 0228231 A 7/1987

(Continued)

OTHER PUBLICATIONS

International Search Report and Written Opinion—PCT/US2007/77403; Apr. 9, 2008; 11 pages; International Searching Authority (United States).

(Continued)

*Primary Examiner* — Xiao Wu
*Assistant Examiner* — Charles Tseng
(74) *Attorney, Agent, or Firm* — Crain Caton & James

(57) ABSTRACT

Systems and methods for imaging waveform volumes. An image of the waveform volume may be drawn on a display device as a two-dimensional image or a three-dimensional image of a sampling probe and redrawn in real-time at interactive rates using a graphics accelerator or a graphics card. The image of the waveform volume may also include seismic-data traces that are color-filled according to texture coordinates for pixels on the display device that intersect the waveform volume.

22 Claims, 14 Drawing Sheets
(11 of 14 Drawing Sheet(s) Filed in Color)

U.S. PATENT DOCUMENTS

| | | | |
|---|---|---|---|
| 6,424,464 | B1 | 7/2002 | Neff et al. |
| 6,473,696 | B1 | 10/2002 | Onyla et al. |
| 6,594,585 | B1 | 7/2003 | Gereztenkom |
| RE38,229 | E | 8/2003 | Marfurt et al. |
| 6,690,820 | B2 | 2/2004 | Lees et al. |
| 6,765,570 | B1 | 7/2004 | Cheung et al. |
| 6,940,507 | B2 | 9/2005 | Repin et al. |
| 6,987,878 | B2 | 1/2006 | Lees et al. |
| 7,006,085 | B1 | 2/2006 | Acosta et al. |
| 7,013,218 | B2 | 3/2006 | Baker, III et al. |
| 7,076,735 | B2 | 7/2006 | Callegari |
| 7,098,908 | B2 | 8/2006 | Acosta et al. |
| 7,102,647 | B2 | 9/2006 | Sloan et al. |
| 7,123,258 | B2 * | 10/2006 | Deny et al. .................... 345/423 |
| 7,136,079 | B2 * | 11/2006 | Luo et al. ...................... 345/611 |
| 7,170,530 | B2 | 1/2007 | Cui et al. |
| 7,218,331 | B2 | 5/2007 | Huang et al. |
| 7,248,258 | B2 | 7/2007 | Acosta et al. |
| 2002/0022930 | A1 | 2/2002 | Bouts et al. |
| 2002/0172401 | A1 | 11/2002 | Lees et al. |
| 2003/0025692 | A1 | 2/2003 | Lu et al. |
| 2004/0081353 | A1 | 4/2004 | Lees et al. |
| 2004/0174357 | A1 | 9/2004 | Cheung et al. |
| 2004/0227772 | A1 | 11/2004 | Huang et al. |
| 2005/0237334 | A1 | 10/2005 | Chuter |
| 2006/0206562 | A1 | 9/2006 | Callegari |
| 2008/0024512 | A1 | 1/2008 | Chuter |

FOREIGN PATENT DOCUMENTS

| | | | |
|---|---|---|---|
| JP | 6-236440 | A | 8/1994 |
| JP | 7-57118 | A | 3/1995 |
| WO | WO/00/14574 | A1 | 3/2000 |
| WO | WO/02/29445 | A1 | 4/2002 |

OTHER PUBLICATIONS

Schwab, Matthias; Enhancement of Discontinuities in Seismic 3-D Images Using a Java Estimation Library; PhD Thesis/Stanford University/Department of Geophysics; Jun. 2001; 164 pages.

Elvins T.T., "A Survey of Algorithms for Volume Visualization" Computer Graphics, ACM, US, vol. 26, No. 3, Aug. 1, 1992, pp. 194-201.

Crawfis R.A. et al., A Scientific Visualization Synthesizer, Visualization 1991 Proceedings, IEEE Conference on San Diego CA, USA, Oct. 22, 1992, pp. 262-267.

Yagel et al., Hardware Assisted Volume Rendering of Unstructured Grids by Incremental Slicing, pp. 1-11, 1996.

Masahiro Fujita et al. "Applying Per-Pixel Shading for Relief Texture Mapping", Report of Research of Information Processing Society of Japan, vol. 2002, No. 1 09, Nov. 22, 2002, 1 page [Abstract Only].

The Open GL Shading Language; 2.1 Introduction to the OpenGL Shading Language; 2.2 Why Write Shaders?; 2.3 OpenGL Programmable Processors; Chapter 2; pp. 33-36.

Computer Graphics: Principles and Practice; Image Manipulation and Storage; Second Edition; p. 838.

Mark J. Kilgard; A Practical and Robust Bump-mapping Technique for Today's GPUs; GDC 2000: Advanced OpenGL Game Development; Jul. 5, 2000; pp. 1-39; NVIDIA Corporation; Santa Clara, California.

Lees Jack A.; Constructing Faults From Seed Picks by Voxel Tracking; The Leading Edge; Mar. 1999; pp. 338-340; Texaco Visualization Geophysical Team; Houston, Texas.

Oldenzeil, T.; Dithuijzen, Roos Van & Kruijsdijk, Cor Van; Geologic Parameterization of Reservoir Model Enhances History-Match Procedure; The Leading Edge; Jun. 2002; pp. 544-551; vol. 21, No. 6.

Pommert, Andreas, Hohne, Karl Heinz, Pflesser, Bernhard, Riemer, Martin, Schiemann, Thomas, Schubert, Rainer, Tiede, Ulf & Schumacher, Udo; A Highly Realistic Volume Model Derived from the Visible Human Male; The Third Visible Human Project Conference, Bethesda, Maryland; Oct. 2000; 11 pages.

Brown, Alistair R., "Interpretation of Three-Dimensional Seismic Data"; AAPG Memoir 42; Dec. 1999 pp. 19, 233, 5th Edition; American Association of Petroleum Geologists.

Texaco E&P Center Allows Visual Probe of 3D Data Volumes, Oil & Gas Journal, Jun. 1, 1998, pp. 46-47, copied as one page.

Yilmaz, Oz, and Lucas, Darran; Prestack Layer Replacement; Geophysics 51(7); Jul. 1986; pp. 1355-1369; vol. 51, No. 7; USA.

Tanner, M. Turhan, Ernest E. and Neidell, Norman S.; Paleo Seismic and Color Acoustic Impedence Sections; Applications of Downward Continuation in Structural and Stratigraphic Context; 1982; pp. 110-111; Expanded Abstract S8.7, 52nd Annual Meeting of The Society of Exploration Geophysicists; Dallas, Texas.

Sheriff, R.E.; Encyclopedic Dictionary of Applied Geophysics; http://scitation.aip.org/journals/doc/SEGLIB-home/segLogin.jsp; 2002; 1 page; 4th Ed.; Society of Exploration Geophysicists; Tulsa, Oklahoma.

"VoxelGeo Consortium Meeting Summary," CogniSeis Development, Jun. 13, 1996, 2 pages.

Levin, Stewart A.; Resolution in Seismic Imaging: Is it all a Matter of Perspective?; Geophysics 63(2); Mar.-Apr. 1998; pp. 743-749; vol. 63, No. 2; USA.

James, Huw, Peloso, Andy and Wang, Joanne; Volume Interpretation of Multi-Attribute 3D Surveys; First Break; Mar. 2002, pp. 176-179; vol. 20:3; EAGE.

Ching-Rong Lin, R. Bowen Loftin, and H. Roice Nelson, Jr., Interaction with Geoscience Data in an Immersive Environment, Virtual Reality, 2000, pp. 55-62.

Ching-Rong Lin and R. Bowen Loftin, Application of Virtual Reality in the Interpretation of Geoscience Data, Proceedings of the ACM Symposium on Virtual Reality Software and Technology, 1998, pp. 187-194.

VoxelGeo, Paradigm Geophysical Broadband Solutions in Depth, Mar. 27, 1998, 5 pages, printed from Cogniseis website www.cogniseis.com/voxelgeo.htm.

Holden, Paul, VoxelGeo 1.1.1: Productivity Tool for the Geosciences, Release Notes (1994) & User's Guide (Rev. Mar. 1994), Vital Images, Inc., pp. 1-461.

OpenWorks Sections, 2004, 12 pages.

Lin, Ching-Rong, Loftin, R. Bowen & Stark, Tracy: Virtual Reality for Geosciences Visualization: Computer Human Interaction; 1998; Proceedings, 3rd Asia Pacific Shonan Village Center; Japan; Jul. 15-17, 1998; pp. 196-201; IEEE Comput. Soc. US, Las Alamitos, CA.

Castanie, Laurent, Bosquet, Fabien & Levy, Bruno; "Advances in Seismic Interpretation Using new Volume Visualization Techniques" First Break (Special Topic-Reservoir Geoscience/Engineering) Oct. 2005; pp. 69-72; vol. 23 EAGE.

Lum, Eric B., Wilson, Brett & Ma, Kwan Liu; "High Quality Lighting and Efficient Pre-Integration for Volume Rendering"; Joint Eurographics—IEEE TCVG Symposium on Visualization/TheEurographics Association; 2004; 11 pages.

Fernando, Randima and Kilgard, Mark J., CG Toolkit—User's Manual: A Developer's Guide to Programmable Graphics; Sep. 2005; 356 Pages; Release 1/4; NVIDIA; Addison-Wesley.

Castanie, Lurent, Levy, Bruno, & Boquet, Fabian; "VolumeExplorer; Roaming Large Volume to Couple Visualization and Dtat Provessing for Oil & Gas Exploration" Oct. 23-28, 2005; pp. 247-254; Proceedings of the IEEE Visualization; Minneapolis MN.

Rost, R., The Open GL Shading Language, 2.1 Introduction to OpenGL Shading Language; 2.2 Why Write Shaders?; 2.3 OpenGL Programmable Processors; Chapter 2, pp. 33-36, Feb. 14, 2004.

Does Your 3D Interpretation Software Move As Fast As You Do? GeoProbe Does Magic Earth Brochure, Sep. 1999, 1 pg.

Neider, Jackie, Davis, Tom, and Woo, Mason; OpenGL Programming Guide; 1994; pp. 422-427; 3rd Edition; Multitexturing; Silicon Graphics, Inc.; Addison-Wesley Professional.

Cai, Wenli and Sakas, Georgios, Data Intermixing and Multi-Volume Rendering; Eurographics '99; 1999; pp. 359-368; vol. 18, No. 3; Blackwell Publishers, Oxford, UK and Malden, MA.

Manssour, Isabel H., Furuie, Sergio S. Olabarriage, Silvia D., and Freitas, Carla M.D.S.; Visualizing Inner Structures in Multimodel Volume Data; XV Brazilian Symposium on Computer Graphics and Image Processing (SIBGRAPI'02); 2002; pp. 51-59.

Mark, William R. Glanville, R. Steven, Akeley, Kurt, and Kilgard, Mark J.; Cg: A System for Programming Graphics Hardware in a C-like Language; Siggraph 2003; pp. 896-907.

Christie, Murray; Thinking Inside the Box; CSEG Recorder; Jun. 2002; pp. 50-57.

Robler, Friedemann, Tejada, Eduadro, Fangmeier, Thomas, Ertl, Thomas, & Knauff, Markus; "GPU-Based Multi-Volume Rendering for the Visualization of Funtion Brain Images"; 14 pages, 2006.

Foley, James D., Van Dam, Adries, Feiner, Steven K. and Hughes, John, Computer Graphics; Principles and Practice (2nd Ed.), 1990, p. 838; Addison Wesley, Boston, Massachusetts, USA.

Dopkin, Duane & James, Huw "Trends in Visualization for E&P Operations" First Break; Mar. 2006; pp. 55-59; vol. 24 EAGE.

Lin, Jim Ching-Rong; "Geoscience Visualization with GPU Programming" SPEI Visualization and Data Analysis; 2005; 9 Pgs, Houston, TX.

Ney, Fishman, "Editing Tools for 3D Medical Imaging," IEEE Computer Graphics & Applications, Nov. 1991, pp. 63-71, vol. 11 issue 6, IEEE Computer Society Press, Los Alamitos, CA, U.S.A.

"Computing", Mechanical Engineering Magazine, 8 Pgs., Oct. 1996, The American Society of Mechanical Engineers.

Cortesi, "REACT Real Time Programmer's Guide", Mar. 18, 1997, 187 pages, Silicon Graphics Inc., California, U.S.A.

Bajaj, et al., "Fast Isocontouring for Improved Interactivity", Proc. ACM SIGGRAPH/IEEE Symposium on Volume Visualization (ACM Press, 1996), pp. 39-46.

Lacroute, "Fast Volume Rendering Using a Shear-Warp Factorization of the Viewing Transformation", Doctoral dissertation submitted to Departments of Electrical Engineering and Computer Science Stanford University, Sep. 1995, 236 pages, Stanford University Stanford, CA, USA.

Cabral, et al., "Accelerated Volume Rendering and Tomographic Reconstruction Using Texture Mapping Hardware", 1995, p. 91-97, Association for Computing Machinery, New York, U.S.A.

Cullip Timothy and Neumann Ulrich, "Accelerating Volume Reconstruction with 3D Texture Hardware", 1993, 6 pages, University of North Carolina, Chapel Hill, U.S.A.

Cignoni, Montani, Scopigno, "MagicSphere: an insight tool for 3D data visualization," 1994, p. 317-328, vol. 13(3), Computer Graphics Forum, The Eurographics Association and Blackwell Publishing Ltd. Oxford, U.K.

Yagel Roni, "The Flipping Cube: A Device for Rotating 3D Rasters", "Advances in Computer Graphics Hardware (Machines)", 1991, p. 86-99.

Höllerer, Hege, Stallings, "Visualization and 3D-Interaction for Hyperthermia Treatment Planning," 1995, 7 pages, Proceedings, 9th International Symposium on Computer Assisted Radiology, CH Volume Visualization Workshop, Berlin, Germany.

Levoy Marc, "Design for a Real-Time High-Quality Volume Rendering Workstation", Proceedings of the Chapel Hill Workshop on Volume Visualization, 1989, p. 85-92, Association for Computing Machinery, New York, U.S.A.

Kanus, et al, "Implimentations of Cube-4 on the Teramac Custom Computing Machine", "Computers and Graphics", 1997, p. 199-208, vol. 21, Elsevier, London, U.K.

Kaufman, Bakalash "Memory and Processing Architecture for 3D Voxel-Based Imagery," "IEEE Computer Applications", Nov.-Dec. 1988, pp. 10-23, vol. 08 No. 6, IEEE Computer Society, Washington D.C., U.S.A.

Brady, et al, "Crumbs: a virtual environment tracking tool for biological imaging," IEEE Symposium on Frontiers in Biomedical Visualization, 1995, p. 18, IEEE Computer Society, Washington DC, U.S.A.

Fraser Robert, "Interactive Volume Rendering Using Advanced Gaphics Architectures," 1994, 8 pages, Silicon Graphics Inc.

Kulic, "Building an OpenGL Volume Renderer" "SGI Development News", 1996, 9 pages.

Serra, et al., "Interactive Vessel Tracing in Volume DATA", 1997, pp. 131-137, "Symposium on 3D Grapics", Providence, RI.

Pfister, Kaufman, "Cube 4—A Scalable Architecture for Real-Time Volume Rendering," Proceedings 1996 IEEE Symposium on Volume Visualization, Oct. 28-29, 1996, pp. 47-54, 100.

Speray, Kennon, "Volume Probes: Interactive data Exploration on Arbitrary Grids" Computer Graphics, vol. 24 issue 5, Nov. 1990, pp. 5-12, Association for Computing Machinery, New York, U.S.A.

Lorensen, Cline, "Marching Cubes: A High Resolution 3D Surface Construction Algorithm," Computer Graphics, vol. 21 issue 4, Jul. 1987, pp. 163-169, Association for Computing Machinery, New York, U.S.A.

IRIS Universe No. 36 Silicon Graphics Inc., Summer 1996, 96 pages.

Durkin, Hughes, "Nonpolygonal Isosurface Rendering for Large Volume Datasets", "Proceedings of the conference on Visualization '94", 1994, p. 293-300, IEEE Computer Society Press, Los Alamitos, CA, U.S.A.

Landmark Graphics Corporation, Operational manual on "Seiscube," Oct. 1996, pp. 1-272.

Landmark Graphics Corporation, Operational manual on "OpenVision," Jul. 1997, pp. 1-169.

Landmark Graphics, User Documentation, Faults (Displaying Faults and Using Seismic Planes with Animation and Frame Control), EarthCube, 2002, pp. 11-15, 53-55.

Landmark Graphics, User Documentation, Seismic (Overview & Seismic Display and Navigation), EarthCube, 2002, pp. 1, 65-115.

Landmark Graphics, User Documentation, Setup (Faults & Selecting an Object), EarthCube, 2002, pp. 13-20, 93-99.

Cogniseis, "VoxelGeo version 2.2 Product Definition version 14", May 1996, 27 pages; Houston, Texas.

VoxelGeo User's Manual 2.1.5, Oct. 1996, 213 Pages, Cogniseis Development, Inc., Houston, Texas.

Jie Hu, First Office Action (for PCT Application Entering the National Phase) issued Aug. 19, 2010 in Application 200780040908, 7 pages, State Intellectual Property Office of the Peoples Republic of China.

First Office Action (for PCT Application Entering the National Phase) issued Aug. 19, 2010 in Application 200780040908 (Translation), 3 pages, China.

* cited by examiner

SYSTEMS AND METHODS FOR IMAGING WAVEFORM VOLUMES

CROSS-REFERENCE TO RELATED APPLICATIONS

The priority of U.S. Provisional Patent Application No. 60/824,334, filed on Sep. 1, 2006, is hereby claimed, and the specification thereof incorporated herein by reference

STATEMENT REGARDING FEDERALLY-SPONSORED RESEARCH

Not Applicable.

FIELD OF INVENTION

The present invention generally relates to systems and methods for imaging a three-dimensional volume of seismic traces (hereinafter "seismic-data traces") representing a waveform volume. The waveform volume may be imaged (displayed) as a two-dimensional or a three-dimensional image of seismic-data traces, sometimes referred to as wiggles or wavelets, at interactive rates.

BACKGROUND OF THE INVENTION

In the applied sciences, various fields of study require the analysis of two-dimensional or three-dimensional volume data-sets wherein each data-set may have multiple attributes representing different physical properties. An attribute, sometimes referred to as a data value, represents a particular physical property of an object within a defined two-dimensional or three-dimensional space. A data value may, for instance, be an 8-byte data word which includes 256 possible values. The location of an attribute is represented by (x, y, data value) or (x, y, z, data value). If the attribute represents pressure at a particular location, then the attribute location may be expressed as (x, y, z, pressure).

In the medical field, a computerized axial topography (CAT) scanner or magnetic resonance imaging (MRI) device is used to produce a picture or diagnostic image of some specific area of a person's body, typically representing the coordinate and a determined attribute. Normally, each attribute within a predetermined location must be imaged separate and apart from another attribute. For example, one attribute representing temperature at a predetermined location is typically imaged separate from another attribute representing pressure at the same location. Thus, the diagnosis of a particular condition based upon these attributes is limited by the ability to display a single attribute at a predetermined location.

In the field of earth sciences, seismic sounding is used for exploring the subterranean geology of an earth formation. An underground explosion excites seismic waves, similar to low-frequency sound waves that travel below the surface of the earth and are detected by seismographs. The seismographs record the amplitude of seismic waves, both direct and reflected, at a given location for a given time period. Knowing the time and place of the explosion, the time of travel of the waves through the interior can be calculated and used to measure the velocity of the waves in the interior. A similar technique can be used for offshore oil and gas exploration. In offshore exploration, a ship tows a sound source and underwater hydrophones. Low frequency, (e.g., 50 Hz) sound waves are generated by, for example, a pneumatic device that works like a balloon burst. The sounds bounce off rock layers below the sea floor and are picked up by the hydrophones. In either application, subsurface sedimentary structures that trap oil, such as faults and domes are mapped by the reflective waves.

The use of seismic data to analyze subsurface geological structures, such as faults or other stratigraphic features, is relevant to interpreters searching for subsurface mineral and hydrocarbon deposits. Seismic-data traces are the record of the reflection of sonic waves from underground. These traces can be denoted as $A(x, y, t)$, the reflection amplitude of time t at surface location $(x, y)$. A wiggle display is a basic graphic representation for seismic applications, which may be displayed as a two-dimensional or a three-dimensional image. On a two-dimensional image, the wiggle display of seismic-data traces is commonly imaged by computing the graphics coordinate $(u, v)$ of each amplitude and drawing polylines connecting these coordinates for each trace. The area of the amplitude above and/or below a given reference amplitude value for a given wiggle can be filled with colors to enhance the wiggle display for interpretation purposes and therefore, make faults and other stratigraphic features revealed by the wiggle display easier to recognize as generally described in U.S. Pat. No. 7,013,218, which is incorporated herein by reference. The colors for amplitude above and below the reference value are normally called positive fill and negative fill, respectively. The color fill is most commonly done by (1) drawing horizontal lines in a given color from the position determined by the reference value to the position determined by the amplitude at a given time/depth, or (2) by filling polygons formed by the reference line and amplitudes. FIGS. 4 through 6 illustrate different images produced by a commercial-software package, which uses the first approach to generate two-dimensional images of seismic-data.

FIG. 4 is an image of a variable density display. In this figure, the seismic data is collected and processed to produce three-dimensional volume data-sets comprising "voxels" or volume elements, whereby each voxel may be identified by the x, y, z coordinates of one of its eight corners or its center. Each voxel also represents a numeric data value (attribute) associated with some measured or calculated physical property at a particular location. Examples of geological seismic data values include amplitude, phase, frequency, and semblance. Different data values are stored in different three-dimensional volume data-sets, wherein each three-dimensional volume data-set represents a different data value. When multitude data-sets are used, the data value for each of the data-sets may represent a different physical parameter or attribute for the same geographic space. By way of example, a plurality of data-sets could include a seismic volume, a temperature volume and a water-saturation volume. The voxels in the seismic volume can be expressed in the form $(x, y, z, \text{seismic amplitude})$. The voxels in the temperature volume can be expressed in the form $(x, y, z, °C.)$. The voxels in the water-saturation volume can be expressed in the form $(x, y, z, \%\ \text{saturation})$. The physical or geographic space defined by the voxels in each of these volumes is the same. However, for any specific spatial location $(x_o, y_o, z_o)$, the seismic amplitude would be contained in the seismic volume, the temperature in the temperature volume and the water-saturation in the water-saturation volume. In order to analyze certain sub-surface geological structures, sometimes referred to as "features" or "events," information from different three-dimensional volume data-sets may be separately imaged in order to analyze the feature or event.

FIG. 5 is an image of a seismic "wiggle" display. And, FIG. 6 is a combined image of FIG. 5 (wiggle display) and FIG. 4 (voxel display). The relationship between a typical wiggle or seismic-data trace and a plurality of voxels is described more fully in U.S. Pat. No. 6,690,820 assigned to Landmark Graphics Corporation, which is incorporated herein by reference. In FIG. 5, the seismic wiggles are displayed with positive fill and negative fill.

The color fill according to the first approach (drawing horizontal lines) is faster than the second approach (filling polygons), but the first approach is not applicable in three-dimensional displays. Both approaches are normally carried out using a computer's CPU, which may be limited by the number of registers. This limitation is an important bottleneck through which a large number of seismic amplitudes (waveforms) must pass through to be visualized. At present, the current state-of-the-art seismic waveform visualization techniques using two-dimensional graphics primitives (polylines, lines, filled polygons) are insufficient to produce images of a three-dimensional volume of seismic-data traces in real-time at interactive rates-meaning at least ten (10) frames per second.

Graphical displays, however, have been generally improved by using a graphics accelerator or a graphics card to process and display other types of graphical data. For example, U.S. Patent Application Publication No. 2005-0237334-A1 assigned to Landmark Graphics Corporation, which is incorporated herein by reference, uses a graphics card to render voxel data in real-time. And, U.S. Pat. No. 7,076,735, also assigned to Landmark Graphics Corporation, uses a graphics card to render graphical data representing a three-dimensional model. Nevertheless, conventional visualization techniques, as thus described, are not capable of rendering a three-dimensional volume of seismic-data traces in real-time for contemporaneous use and analysis.

SUMMARY OF THE INVENTION

The present invention meets the above needs and overcomes one or more deficiencies in the prior art by providing systems and methods for imaging a three-dimensional volume of seismic-data traces representing a waveform volume.

In another embodiment, the present invention includes a method for imaging a three-dimensional volume of seismic-data traces representing a waveform volume that comprises (i) retrieving texture coordinates (s, t) for a pixel in a display device that intersects the waveform volume; (ii) computing an amplitude for a first trace at pixel texture coordinate (t) representing a first trace amplitude; (iii) computing a texture coordinate (S) for the first trace amplitude; (iv) coloring the pixel with a preset trace color if the first trace amplitude texture coordinate (S) is equal to the pixel texture coordinate (s); (v) computing an amplitude for a second trace at pixel texture coordinate (t) representing a second trace amplitude; (vi) computing a texture coordinate (S') for the second trace amplitude; (vii) coloring the pixel with the preset trace color if the second trace amplitude texture coordinate (S') is equal to the pixel texture coordinate (s); (viii) coloring the pixel with a preset background color if the second trace amplitude texture coordinate (S') is greater than the pixel texture coordinate (s); and (ix) modifying the pixel texture coordinates (s, t) and repeating the computing and coloring steps if an iteration count is less than a desired seismic-data trace overlap.

In yet another embodiment, the present invention includes a non-transitory computer readable medium tangibly carrying computer executable instructions for imaging a three-dimensional volume of seismic-data traces representing a waveform volume. The instructions are executable to implement (i) retrieving texture coordinates (s, t) for a pixel in a display device that intersects the waveform volume; (ii) computing an amplitude for a first trace at pixel texture coordinate (t) representing a first trace amplitude; (iii) computing a texture coordinate (S) for the first trace amplitude; (iv) coloring the pixel with a preset trace color if the first trace amplitude texture coordinate (S) is equal to the pixel texture coordinate (s); (v) computing an amplitude for a second trace at pixel texture coordinate (t) representing a second trace amplitude; (vi) computing a texture coordinate (S') for the second trace amplitude; (vii) coloring the pixel with the preset trace color if the second trace amplitude texture coordinate (S') is equal to the pixel texture coordinate (s); (viii) coloring the pixel with a preset background color if the second trace amplitude texture coordinate (S') is greater than the pixel texture coordinate (s); and (ix) modifying the pixel texture coordinates (s, t) and repeating the computing and coloring steps if an iteration count is less than a desired seismic-data trace overlap.

Additional aspects, advantages and embodiments of the invention will become apparent to those skilled in the art from the following description of the various embodiments and related drawings.

BRIEF DESCRIPTION OF THE DRAWINGS

The patent or application file contains at least one drawing executed in color. Copies of this patent or patent application publication with color drawing(s) will be provided by the United States Patent and Trademark Office upon request and payment of the necessary fee.

The present invention will be described with reference to the accompanying drawings in which like elements are referenced with like reference numerals, and in which.

DETAILED DESCRIPTION OF THE PREFERRED EMBODIMENTS

The subject matter of the present invention is described with reference to certain preferred embodiments however, is not intended to limit the scope of the invention. The claimed subject matter thus, might also be embodied in other ways to include different steps, or combinations of steps, similar to the ones described herein and other technologies. Although the term "step" may be used herein to describe different elements of methods employed, the term should not be interpreted as implying any particular order among or between various steps herein disclosed unless otherwise expressly limited by the description to a particular order.

The present invention provides improved systems and methods for imaging a three-dimensional volume of seismic-data traces representing a waveform volume in the form of a two-dimensional or a three-dimensional wiggle display image.

In one embodiment, the present invention may be described in the general context of a computer-executable program of instructions, such as program modules, generally referred to as software. The software may include, for example, routines, programs, objects, components, data structures, etc., that perform particular tasks or implement particular abstract data types. The software forms an interface to allow a computer to react according to a source of input. The software may also cooperate with other code segments to initiate a variety of tasks in response to data received in conjunction with the source of the received data. The software may be stored onto any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire, free space and/or through any of a variety of networks such as the internet.

Those skilled in the art will appreciate that the present invention may be implemented in a variety of computer-system configurations including hand-held devices, multi-processor systems, microprocessor-based or programmable-consumer electronics, minicomputers, mainframe computers and the like. Any number of computer-systems and computer networks are therefore, acceptable for use with the present invention. The present invention may be practiced in distributed-computing environments where tasks are performed by remote-processing devices that are linked through a communications network. In a distributed-computing environment, the software may be located in both local and remote computer-storage media including memory storage devices.

The present invention may therefore, be implemented using hardware, software or a combination thereof, in a computer system or other processing system.

Figure 1:
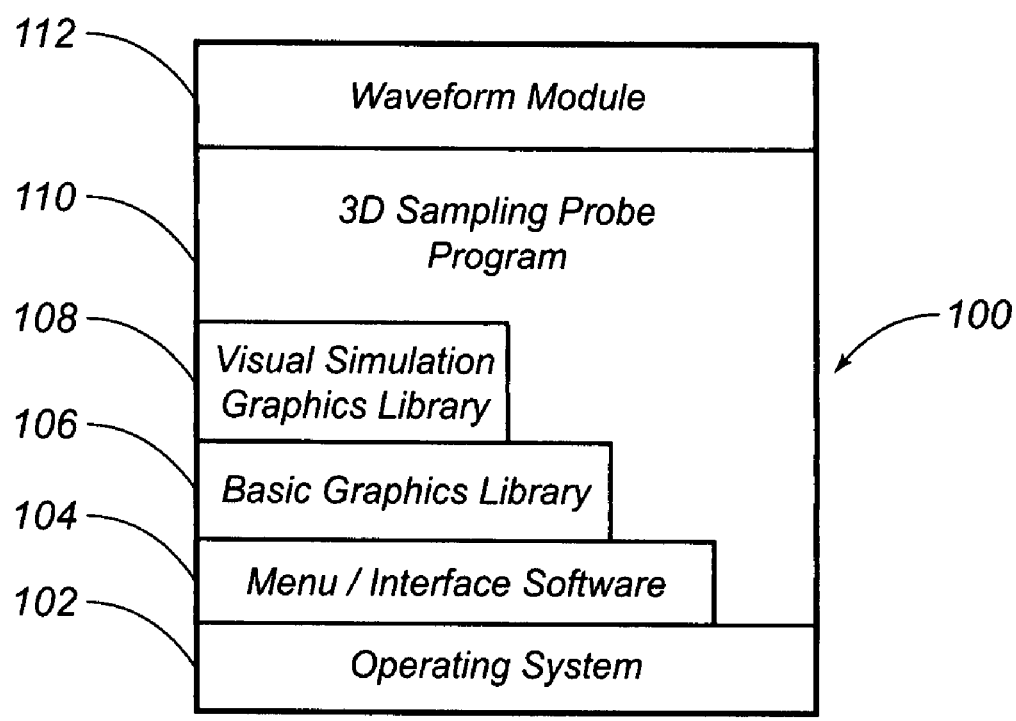
FIG. 1 is a block diagram illustrating one embodiment of a software program for implementing the present invention.

FIG. 1 is a block diagram illustrating one embodiment of a software program 100 for the present invention. At the base of the program 100 is an operating system 102. A suitable operating system 102 may include, for example, a Windows® operating system from Microsoft Corporation, or other operating systems as would be apparent to one of skill in the relevant art.

Menu/interface software 104 overlays the operating system 102. The menu/interface software 104 are used to provide various menus and windows to facilitate interaction with the user, and to obtain user input and instructions. As would be readily apparent to one of skill in the relevant art, any number of menu/interface software programs could be used in conjunction with the present invention.

A basic graphics library 106 overlays menu/interface software 104. Basic graphics library 106 is an application programming interface (API) for three-dimensional computer graphics. The functions performed by basic graphics library 106 may include, for example, geometric and raster primitives, RGBA or color index mode, display list or immediate mode, viewing and modeling transformations, lighting and shading, hidden surface removal, alpha blending (translucency), anti-aliasing, texture mapping, atmospheric effects (fog, smoke, haze), feedback and selection, stencil planes and accumulation buffer.

A visual simulation graphics library 108 overlays the basic graphics library 106. The visual simulation graphics library 108 is an API for creating real-time, multi-processed three-dimensional visual simulation graphics applications. As will be understood by those skilled in the art, the visual simulation graphics library 108 may include a suite of tools for two-dimensional and/or three-dimensional seismic data interpretations including, for example, interactive horizon and fault management, three-dimensional visualization and attribute analysis. The visual simulation graphics library 108 therefore, provides functions that bundle together graphics library state control functions such as lighting, materials, texture, and transparency. These functions track state and the creation of display lists that can be rendered later.

Overlaying the elements of program 100 previously described, is a 3D sampling probe program 110 that interfaces with, and utilizes the functions carried out by, the visual simulation graphics library 108, the basic graphics library 106, the menu/interface software 104 and the operating system 102 in the manner described in U.S. Pat. No. 6,765,570 assigned to Landmark Graphics Corporation, which is incorporated herein by reference. The sampling probe program 110, visual simulation graphics library 108, basic graphics library 106, menu/interface software 104 and operating system 102 are executed on one or more general purpose CPU's as described in the '570 patent. An acceptable CPU may include, for example, processors marketed by Intel® and AMD®.

Overlaying the sampling probe program 110 is a waveform module 112. The waveform module 112 may be written in a procedural language such as, for example, Open GL Shader Language ("GLSL"), which makes it possible to program a Graphics Processing Unit, sometimes referred to as a graphics processor, graphics accelerator or graphics card (hereinafter "GPU"), to achieve visualization effects that are not available using Open GL, marketed by Silicon Graphics, Inc., and the video hardware—i.e., the graphics card. GLSL is well known in the art and is published (ISBN 0-321-19789-5) in "The Open GL Shading Language." The advantages of programming a conventional GPU, instead of a CPU, to execute the waveform module 112 are its large number of registers and its architecture, which enables massive parallelization of the processors. This architecture can process data in the registers in a few GPU cycles—while it may take a few thousand CPU cycles for the same task. GLSL works with individual pixels at (u, v) of the projection plane on a display device. Through GLSL shaders, one can determine how a pixel at (u, v) is illuminated. An acceptable CPU, for example, may include the NVIDIA® G-70 graphics card and a Qudro 5500 graphics port marketed by NVIDIA®. Other GPU's well known in the art may be acceptable if they are capable of executing fragment (pixel) shader programs written with GLSL and support, at a minimum, looping and branching functions.

The waveform module 112 is configured to interface with the sampling probe program 110. The sampling probe program 110 creates a three-dimensional sampling probe in the manner described by the '570 patent, which may comprise a subvolume of a wave form volume. In other words, the sampling probe program 110 extracts a subvolume data set from the waveform volume, which corresponds to a surface of the sampling probe. The waveform module 112 receives the subvolume-data set from the sampling probe program 110 and processes the subvolume-data set using the GPU to draw at least a portion of an image of the sampling probe on a display device. The image of the sampling probe therefore, may comprise an intersection of the sampling probe and the waveform volume, or the image may be limited to only an intersection of the sampling probe and the waveform volume. The waveform module 112 may be configured to draw at least a portion of an image of the sampling probe on a display device by coloring the subvolume-data set and texture mapping the subvolume-data set onto the surface of the sampling probe. The subvolume-data set may be colored by coloring each seismic-data trace in the subvolume-data set with a preset trace color, color filling each seismic-data trace in the subvolume-data set with a preset positive fill color or a preset negative fill color, and coloring a remainder of the subvolume-data set with the preset background color. In addition, the waveform module 112 may be configured to color each seismic-data trace by coloring each pixel on the display device with the preset trace color if the pixel intersects a seismic-data trace in the subvolume-data set. Likewise, the waveform module 112 may be configured to color fill each seismic-data trace by coloring each pixel on the display device with the preset positive fill color if the pixel intersects the subvolume-data set between a seismic-data trace maximum positive amplitude and a seismic-data trace zero amplitude, and coloring each pixel on the display device with the preset negative fill color if the pixel intersects the subvolume-data set between a seismic-data trace maximum negative amplitude and the seismic-data trace zero amplitude. The waveform module 112 may also be configured to color the remainder of the subvolume-data set by coloring each pixel on the display device with the preset background color if the pixel does not intersect a seismic-data trace and does not intersect the subvolume-data set between a seismic-data trace maximum positive amplitude or a seismic-data trace maximum negative amplitude and a seismic-data trace zero amplitude. The image of the sampling probe may be repeatedly drawn in response to movement of the sampling probe within the waveform volume so that as the sampling probe moves through the waveform volume, the image of the sampling probe is redrawn at a rate that is sufficiently fast to be perceived as moving in real time. Exemplary methods that are enabled by the waveform module 112 are further described in reference to FIG. 2-3.

While the present invention is described with reference to processing a three-dimensional volume of seismic-data traces representing a waveform volume, other seismic-data sets may be processed in the same manner, such as voxel data sets, to produce a two-dimensional or three-dimensional image in real-time. Geoprobe® and PowerView®, which are a commercial-software packages marketed by Landmark Graphics Corporation for use in the oil and gas industry, are examples of appropriate interface applications. Geoprobe® is the commercial embodiment of the sampling probe program 110, which may be used to interface with the waveform module 112 to render a three-dimensional image of a seismic-data set, including seismic-data traces and voxels, in real-time. Alternatively, PowerView® may be used to interface with the waveform module 112 to render a two-dimensional image of a seismic-data set, including seismic-data traces and voxels, in real-time.

The program 100 illustrated in FIG. 1 may be executed or implemented through the use of a computer system incorporating the program 100 and various hardware components. The system hardware components may include, for example, a processor, memory (e.g., random access memory and/or non-volatile memory devices), one or more input devices, one or more display devices, and one or more interface devices. These hardware components may be interconnected according to a variety of configurations and may include one or more CPU's and CPU's configured in the manner described in the '570 patent. Non-volatile memory devices may include, for example, devices such as tape drives, semiconductor ROM or EEPROM. Input devices may include, for example, devices such as a keyboard, a mouse, a digitizing pad, a track ball, a touch-sensitive pad and/or a light pen. Display devices may include, for example, devices such as monitors, projectors and/or head-mounted displays. Interface devices may be configured to require digital image data from one or more acquisition devices and/or from one or more remote computers or storage devices through a network. Any variety of acquisition devices may be used depending on the type of object being imaged. The acquisition device(s) may sense various forms of mechanical energy (e.g., acoustic (seismic) energy, displacement and/or stress/strain).

Each processor (GPU and CPU) may be configured to reprogram instructions and/or data from RAM and/or non-volatile memory devices, and to store computational results into RAM and/or non-volatile memory devices. The program 100 directs each processor to operate on a three-dimensional volume of seismic-data traces and other two-dimensional or three-dimensional seismic data-sets based on the methods described herein.

Figure 2:
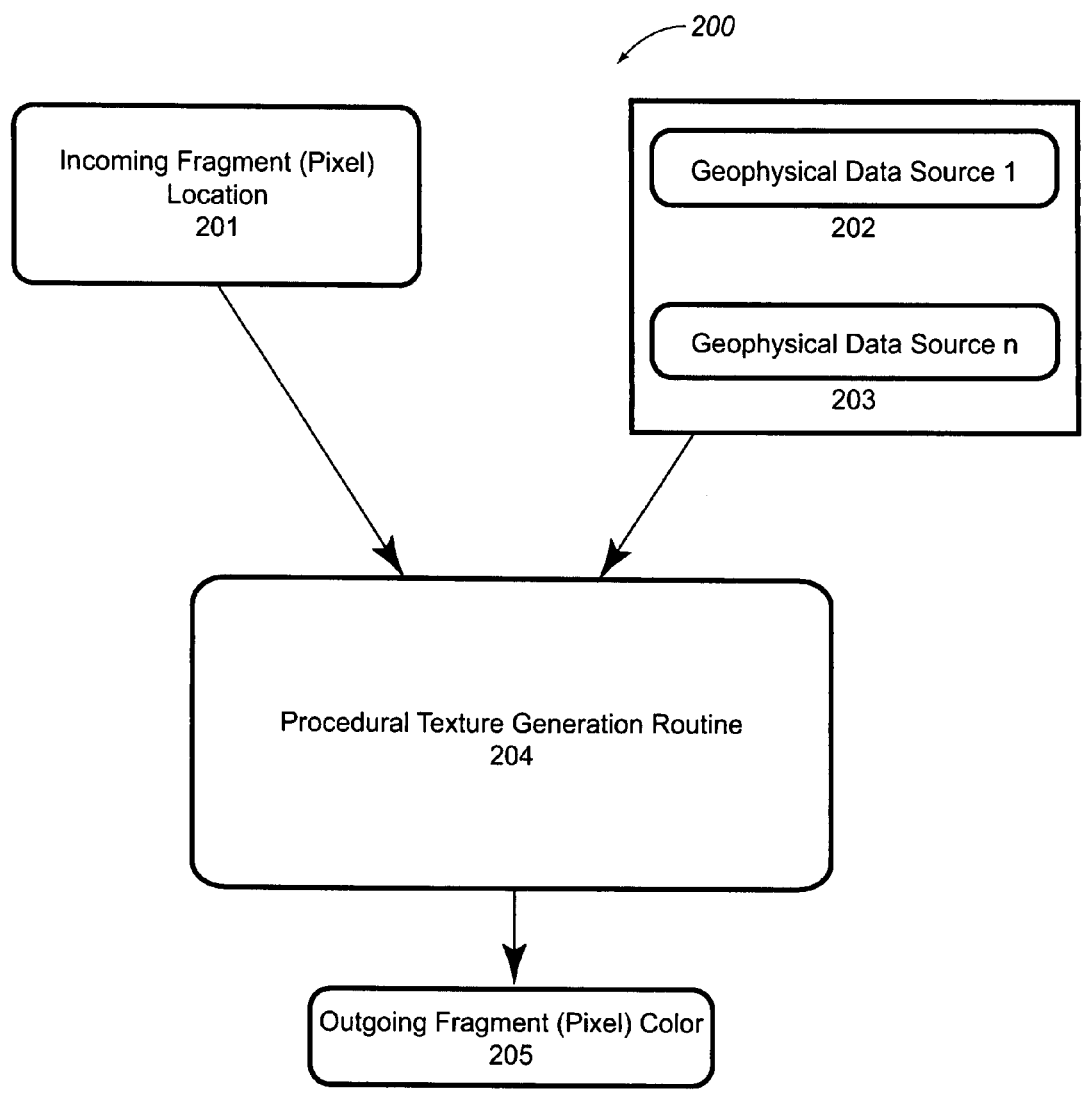
FIG. 2 is a flow diagram illustrating one embodiment of a method for implementing the present invention.

Referring now to FIG. 2, a flow diagram generally illustrates one embodiment of a method 200 for implementing the present invention through a procedural texture generation routine 200 that displays generalized geophysical data. The fragment (pixel) location 201, which intersects one or more geophysical data sources 202 and/or 203 on a display device, and the specified data source (s) 202 and/or 203 are input into the procedural texture generation routine 204. A geophysical data source may include a waveform volume, for example, but may also include any other geophysical seismic data-sets such as, for example, voxel data sets with amplitude, frequency or phase data values. The input data may be provided to the computer system through a variety of mechanisms. For example, the input data may be acquired into non-volatile memory and/or RAM using one or more interface devices. As another example, the input data may be supplied to the computer system through a memory medium such as a disk or a tape, which is loaded into/onto one of the non-volatile memory devices. In this case, the input data will have been previously recorded onto the memory medium. It is noted that the input data may not necessarily be raw sensor data obtained by an acquisition device. For example, the input data may be the result of one or more processing operations using a set of raw sensor data. The processing operation(s) may be performed by the computer system and/or one or more other computers. The input data may be stored in a format generally well known in the art and/or described in the '570 patent. With the data source (s) 202 and/or 203 in place, the routine 204 can be executed on the GPU to transform the inputs into an output fragment pixel) color 205 on the display device. One example of an output for the routine 204 is a wiggle texture-which may be displayed as a two-dimensional or a three-dimensional image of a waveform volume and manipulated at interactive rates, meaning in real-time.

In order to draw a wiggle texture with GLSL, the associated amplitude A(x,y,t) for a given pixel (u, v) must first be obtained in order to determine the illumination of the pixel based on A(x,y,t). The routine 204 therefore, proposes a completely opposite approach to the conventional technique of wiggle texture drawing (where the position (u, v) of an amplitude is computed from a given A (x,y,t)) as explained further in reference to FIG. 3.

Figure 3:
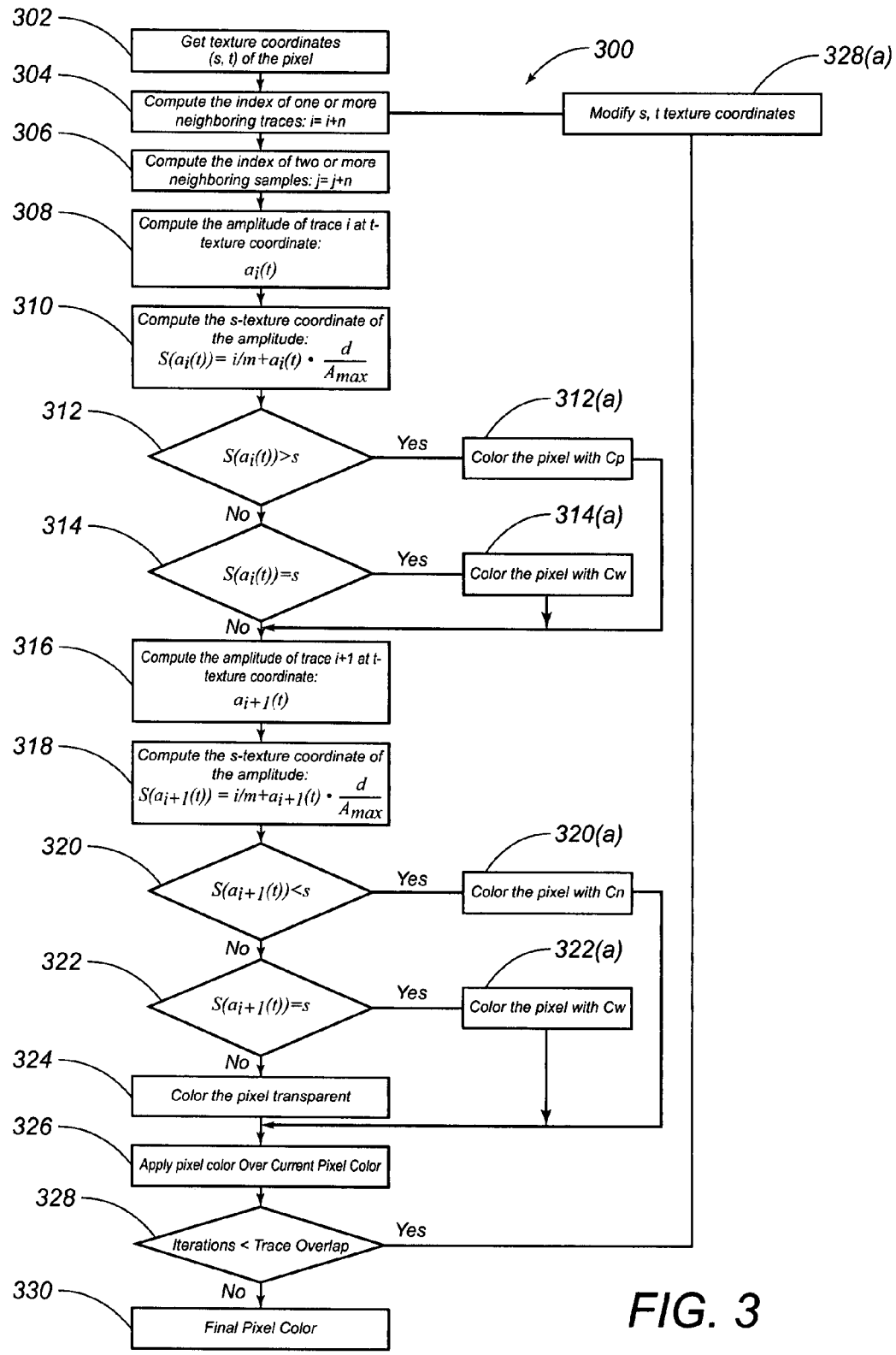
FIG. 3 is a flow diagram illustrating a particular implementation of the procedural texture generation routine illustrated in FIG. 2.
Figure 4:
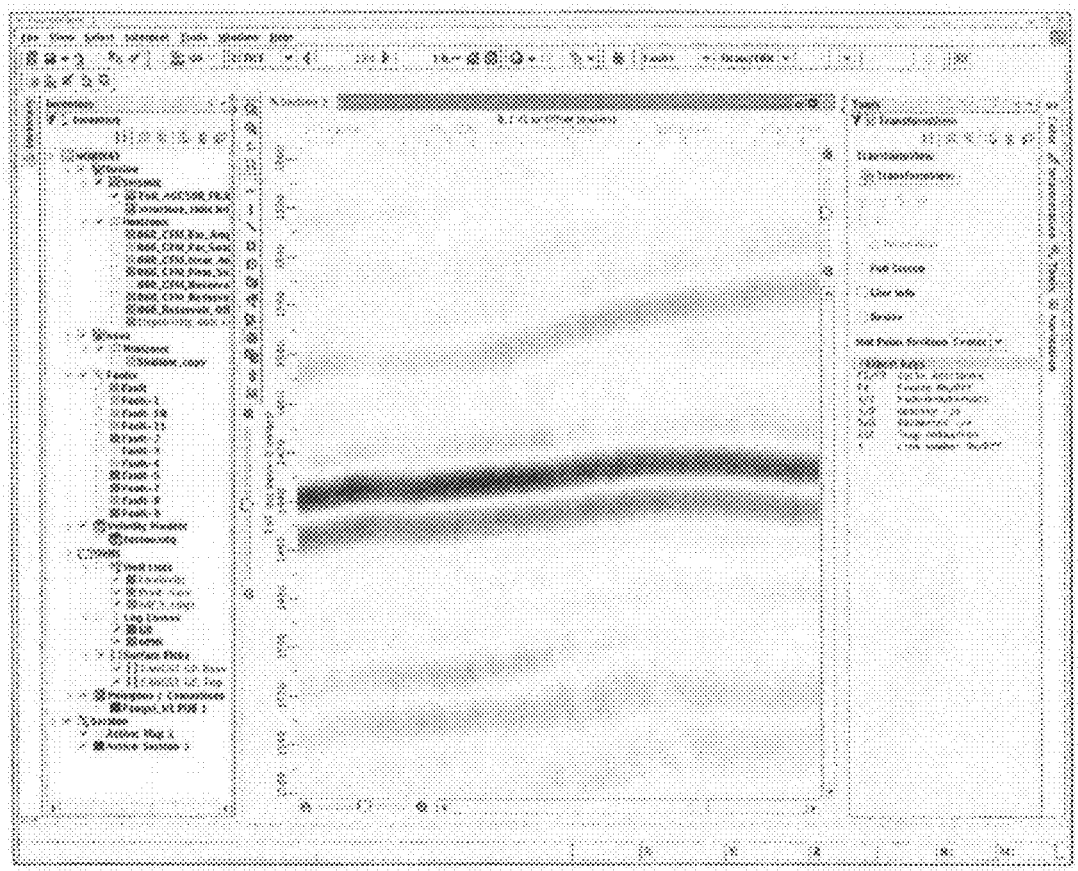
FIG. 4 is a color drawing illustrating a conventional two-dimensional variable-density display.
Figure 5:
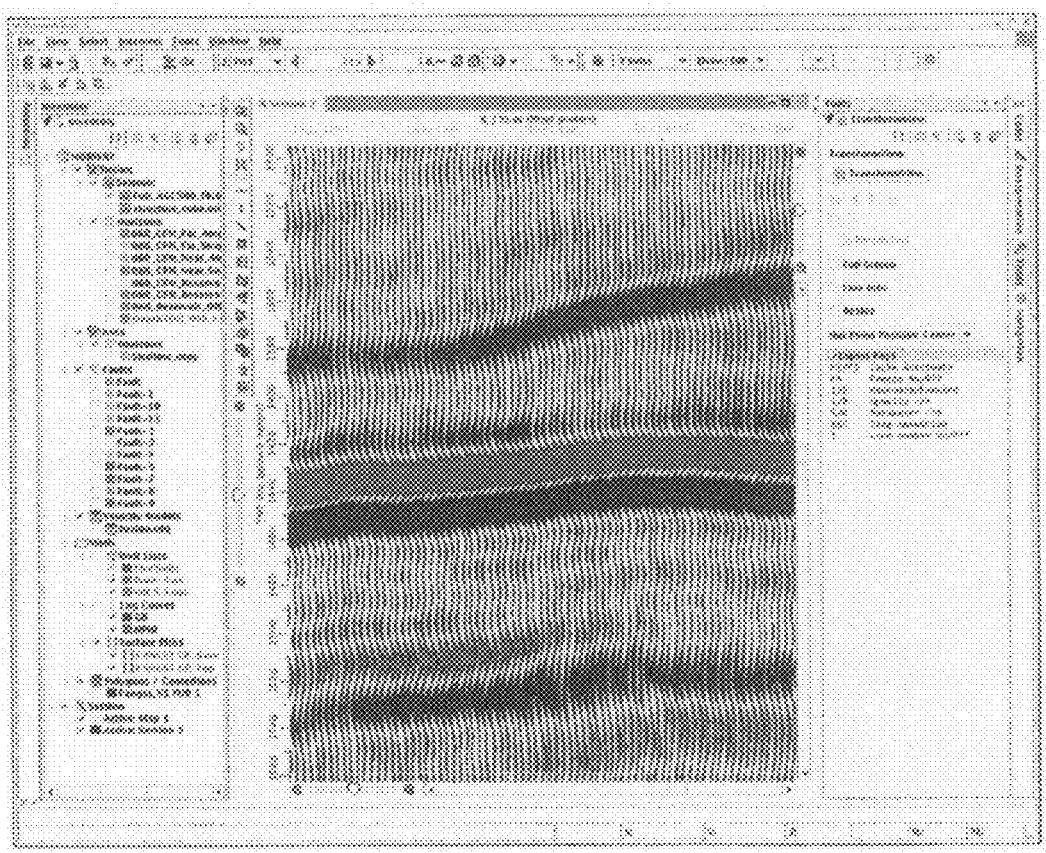
FIG. 5 is a color drawing illustrating a conventional two-dimensional wiggle display with positive fill and negative fill.
Figure 6:
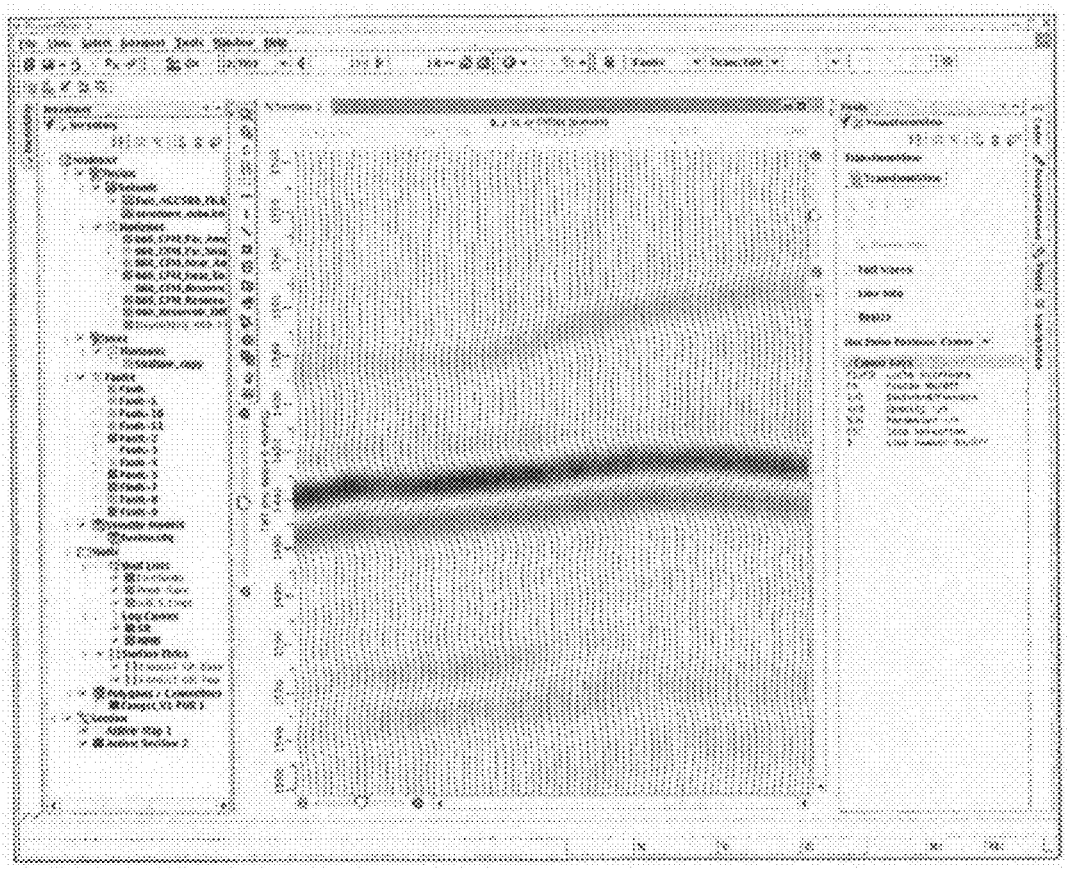
FIG. 6 is a color drawing illustrating a conventional two-dimensional combined-wiggle display and variable-density display.

In FIG. 3, a flow diagram illustrates a particular implementation of the routine 204 illustrated in FIG. 2 for imaging a three-dimensional volume of seismic-data traces as a wiggle texture representing a two-dimensional or a three-dimensional image of a waveform volume. The geophysical data source(s) 202 and/or 203 that are used as input for the routine 204 pass amplitude as a texture map A(s, t) to video memory or the CPU registers. For m traces and n samples per trace, the size of the texture map is roughly m by n bytes or floats. The s-dimension of the texture map corresponds to m traces. Therefore, the s-texture coordinate of i-th trace is i/m. Similarly, the t-texture coordinate of j-th sample is j/n. To draw the seismic-data traces as a wiggle texture representing a two-dimensional or a three-dimensional image of the waveform volume, a quadrilateral with four vertices is defined. Each vertex is defined by 2 or 3 coordinates (for two-dimensional or three-dimensional cases, respectively) and a pair of texture coordinates (s, t). The illumination of each pixel or voxel is determined on the basis of the texture coordinates.

In step 302, the texture coordinates (s, t) for a pixel in a display device that intersects the waveform volume may be retrieved from memory. The texture coordinates determine the texture value, or the amplitude in this case, at the chosen pixel. The texture coordinates also determine the position of the pixel in the texture map, or the position of the pixel in the trace-sample grid in this case.

In step 304, an index value for each trace adjacent the pixel texture coordinates may be computed. From the s-texture coordinate of the pixel, the two neighboring traces i and i+1 with i=floor(s*m) can be found.

In step 306, an index value for each sample adjacent the pixel texture coordinates may be computed. From the t-texture coordinate of the pixel, the two neighboring samples j and j+1 with j=floor(t*n) can be found.

In step 308, the results of step 304 and step 306 are used to compute an amplitude for a first trace (i) at pixel texture coordinate (t) representing a first trace amplitude $a_i(t)$. For the first trace (i), the amplitude at t-texture coordinate is interpolated by a=Sp(A(i, j)) where Sp(A(i,j)) is a suitable interpolating spline (e.g. linear, quadratic, cubic).

In step 310, supposing that the width of each trace in texture space is d and the maximum amplitude for the trace width is $A_{max}$, a texture coordinate for the first trace amplitude may be computed by: $S(a_i(t))=i/m+a_i(t)*d/A_{max}$ and simply represented as the first trace amplitude texture coordinate (S).

In step 312, the first trace amplitude texture coordinate (S) is compared to the pixel texture coordinate (s). If the first trace amplitude texture coordinate (S) is greater than the pixel texture coordinate (s), then the pixel is colored with a preset positive fill color $C_p$ at step 312(a) and the routine 300 proceeds to step 316. The preset positive fill color $C_p$ may be a constant color or a variable color, which is adjusted according to the first trace amplitude.

In step 314, the first trace amplitude texture coordinate (S) is again compared to the pixel texture coordinate (s). If the first trace amplitude texture coordinate (S) is equal to the pixel texture coordinate (s), then the pixel is colored with a preset trace color $C_w$ at step 314(a) and the routine 300 proceeds to step 316. The preset trace color $C_w$ is preferably a different color than the preset positive fill color and is normally constant.

In step 316, the results of step 304 and step 306 are used again to compute an amplitude for a second trace (i+1) at pixel texture coordinate (t) representing a second trace amplitude $a_{i+1}(t)$.

In step 318, assuming again that the width of each trace in texture spaces is d and the maximum amplitude for the trace width is $A_{max}$, a texture coordinate for the second trace amplitude may be computed by $S(a_{i+1}(t))=i/m+a_{i+1}(t)*d/A_{max}$ and simply represented as the second trace amplitude texture coordinate (S').

In step 320, the second trace amplitude texture coordinate (S') is compared to the pixel texture coordinate (s). If the second trace amplitude texture coordinate (S') is less than the pixel texture coordinate (s), then the pixel is colored with a preset negative fill color $C_n$ at step 320(a) and the routine 300 proceeds to step 326. The preset negative fill color $C_n$ may be a constant color or a variable color, which is adjusted according to the second trace amplitude. The preset negative fill color is preferably a different color than the preset positive fill color and the preset trace color.

In step 322, the second trace amplitude texture coordinate (S') is again compared to the pixel texture coordinate (s). If the second trace amplitude texture coordinate (S') is equal to the pixel texture coordinate (s), then the pixel is colored with the preset trace color $C_w$ at step 322(a) and the routine 300 proceeds to step 326.

In step 324, the pixel is colored with a preset-constant-background color, which may be transparent, white or any other desired color corresponding to A (s,t), if the second trace amplitude texture coordinate (S') is greater than the pixel texture coordinate (s). The preset background color is preferably a different color than the preset positive fill color, the preset negative fill color and the preset trace color.

In step 326, the pixel color resulting from the routine 300 (i.e., the trace color, the background color, the positive fill color or the negative fill color) is applied over a current pixel color on the display device using a Porter-Duff over operator, and the current pixel color is then set to the resulting color. The Porter-Duff over operator is well known in the art and published (ISBN 0-201-84840-6) in "Computer Graphics: Principles and Practice," Second Edition at p. 838.

In step 328, an iteration count for the routine 300 is compared to a desired seismic-data trace overlap. If the iteration count for the routine 300 is less than the desired seismic-data trace overlap, then a next trace may be selected at step 328(a) and the routine 300 is repeated beginning at step 304. Otherwise, the routine 300 proceeds to step 330, which may result in the final pixel color on the display device. The next trace selected in step 328(a) may be represented as i−1 or i+2 if the iteration count is 1 less than the desired seismic-data trace overlap. If the iteration count is 2 less than the desired seismic-data trace overlap, then the next trace may be represented as i−2 or i+3 and the routine 300 is repeated beginning at step 304 until the iteration count is equal to or greater than the desired seismic-data trace overlap.

In step 330, the routine 300 may be repeated for each pixel in the display device that intersects the waveform volume. The resulting image may be displayed as a two-dimensional or a three-dimensional image of at least a portion of the waveform volume.

Figure 7:
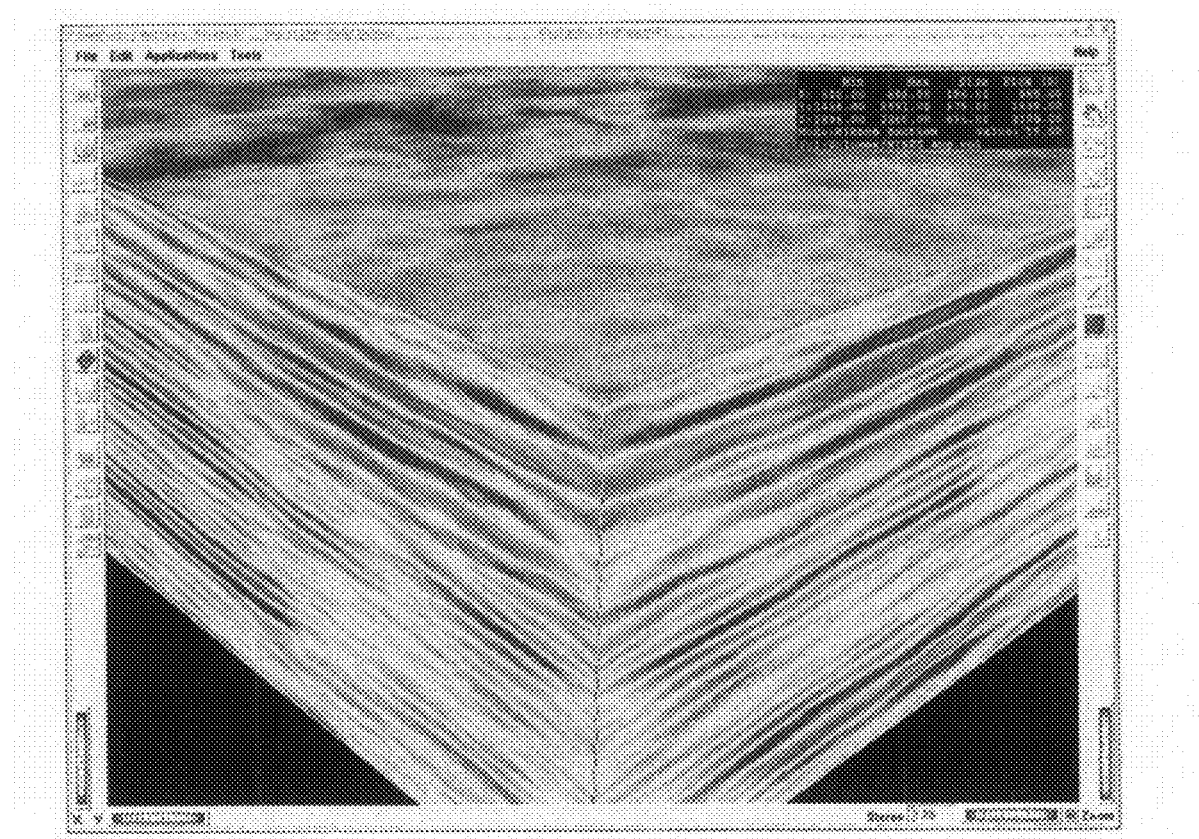
FIG. 7 is a color drawing illustrating a three-dimensional variable-density display.
Figure 8:
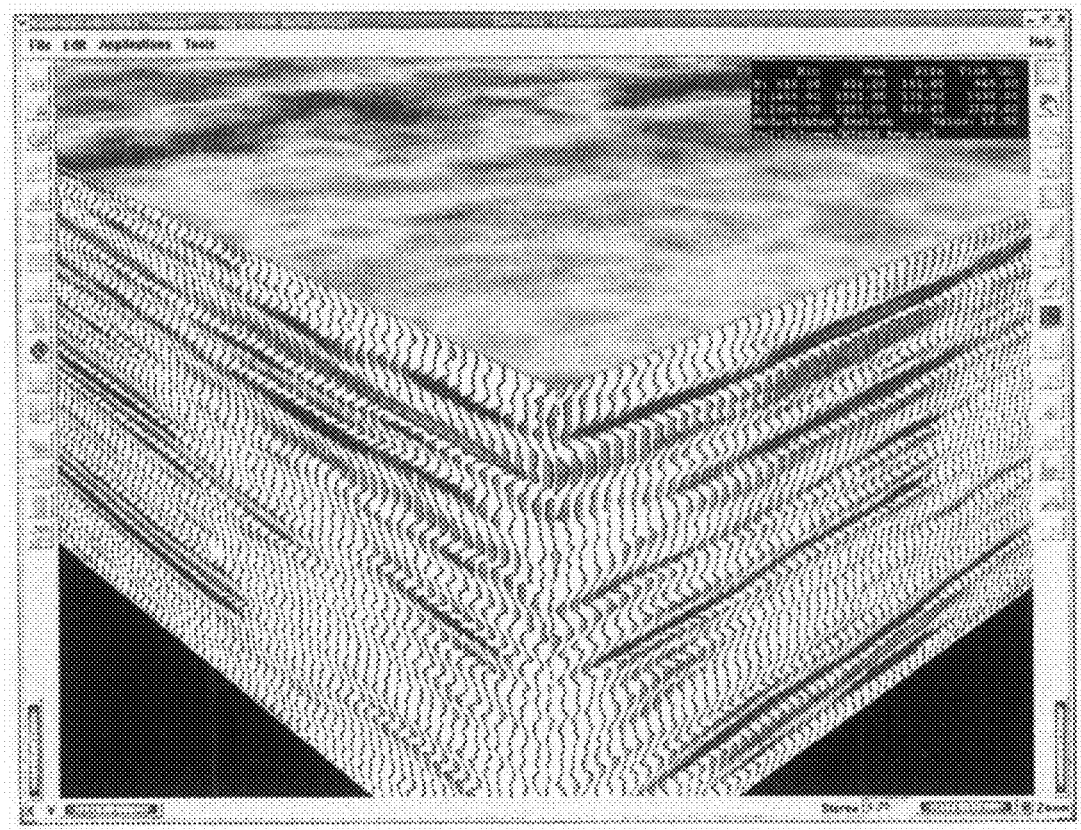
FIG. 8 is a color drawing illustrating a three-dimensional wiggle display.
Figure 9:
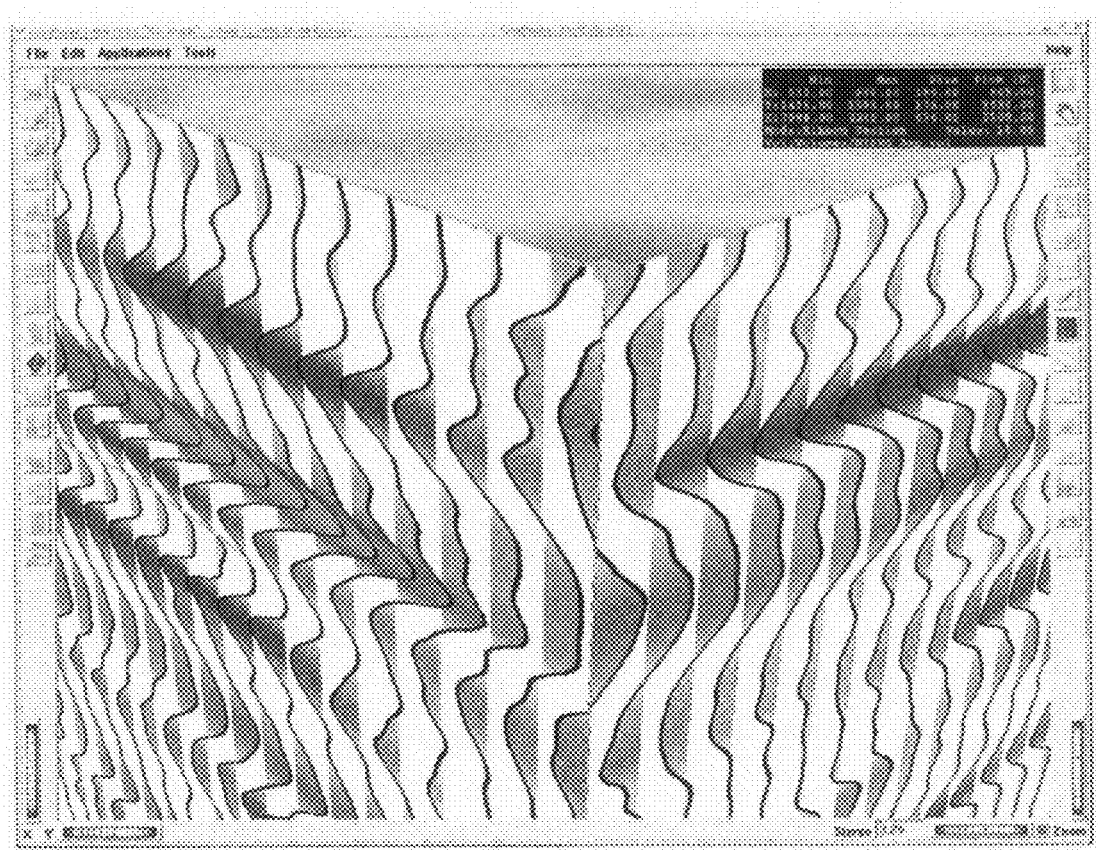
FIG. 9 is a color drawing illustrating a close-up of the three-dimensional wiggle display illustrated in FIG. 8.
Figure 10:
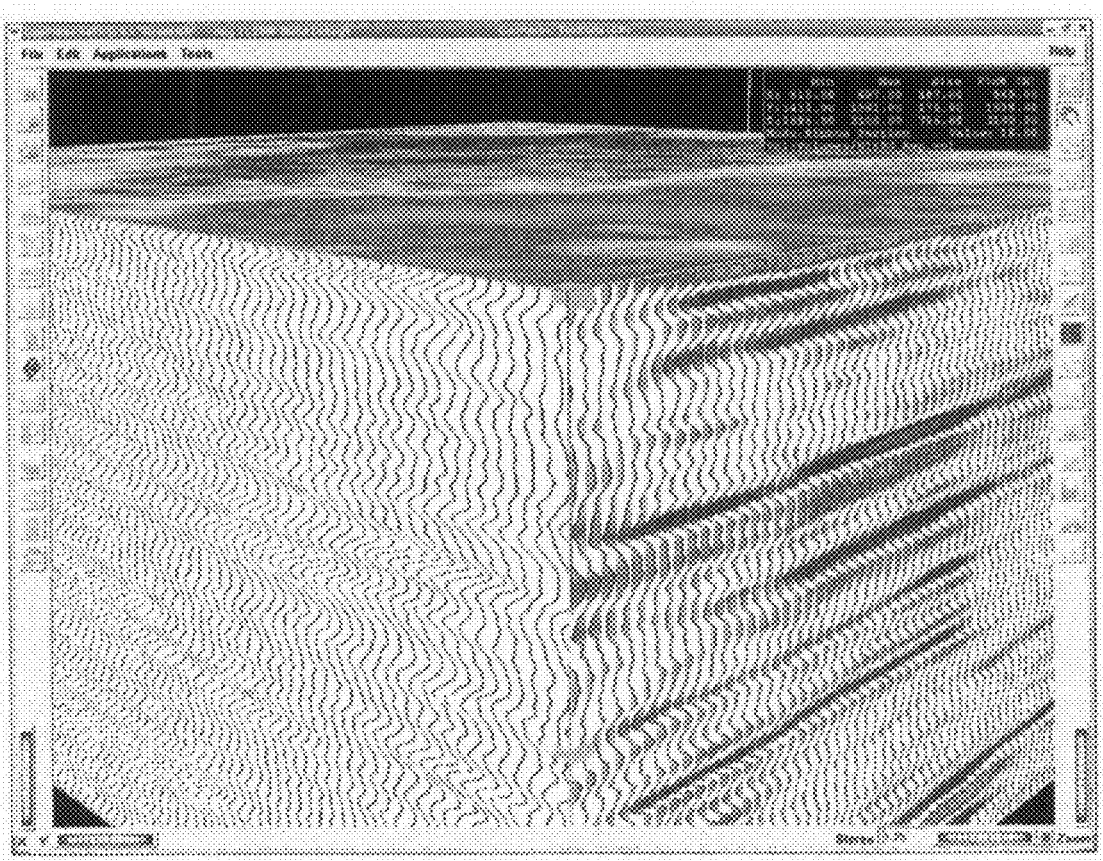
FIG. 10 is a color drawing illustrating a three-dimensional wiggle display with partial positive fill, partial negative fill and a blue horizon intersection.
Figure 11:
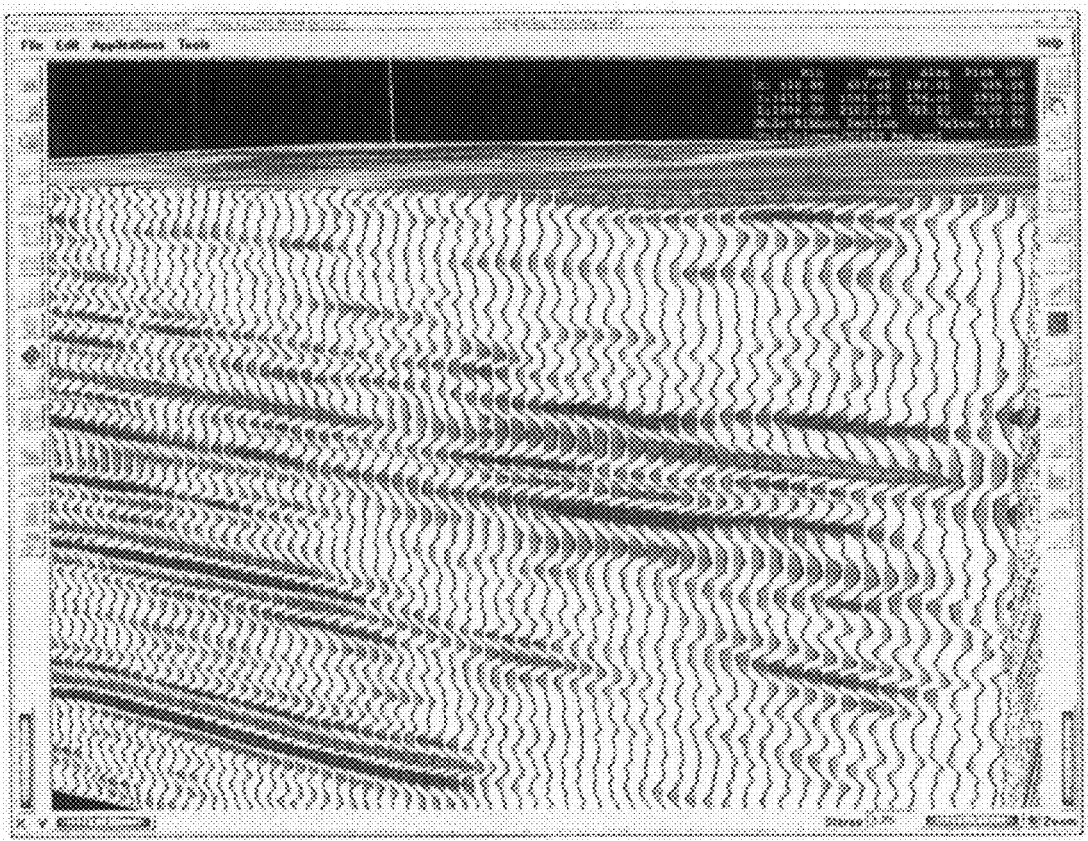
FIG. 11 is a color drawing illustrating a three-dimensional wiggle display with positive fill, negative fill and a blue horizon intersection.
Figure 12:
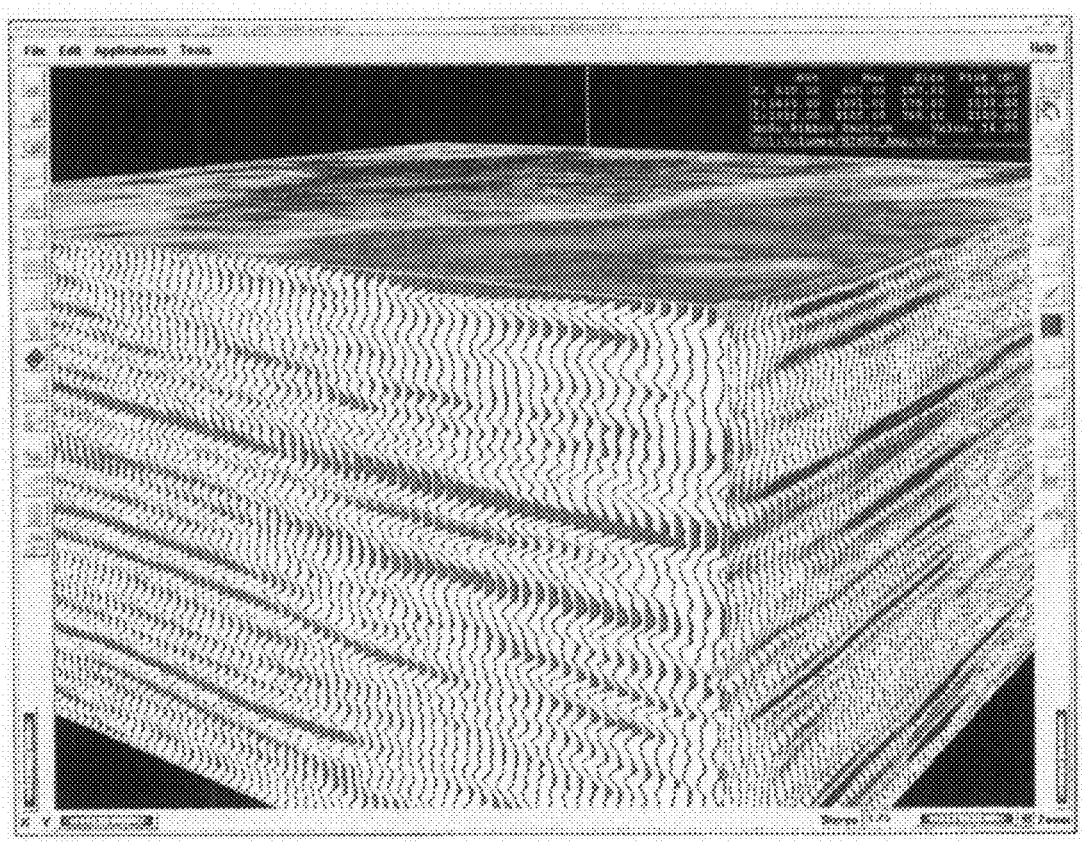
FIG. 12 is a color drawing illustrating a three-dimensional wiggle display with just positive fill.
Figure 13:
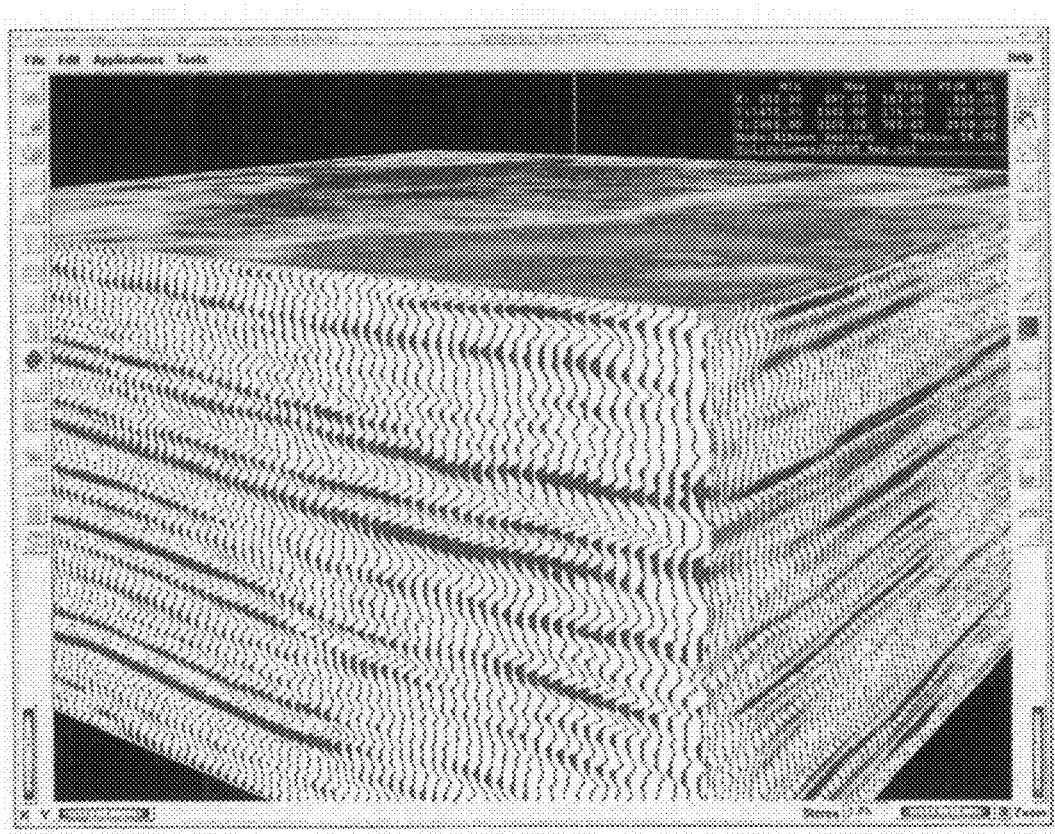
FIG. 13 is a color drawing illustrating a three-dimensional wiggle display with just negative fill.
Figure 14:
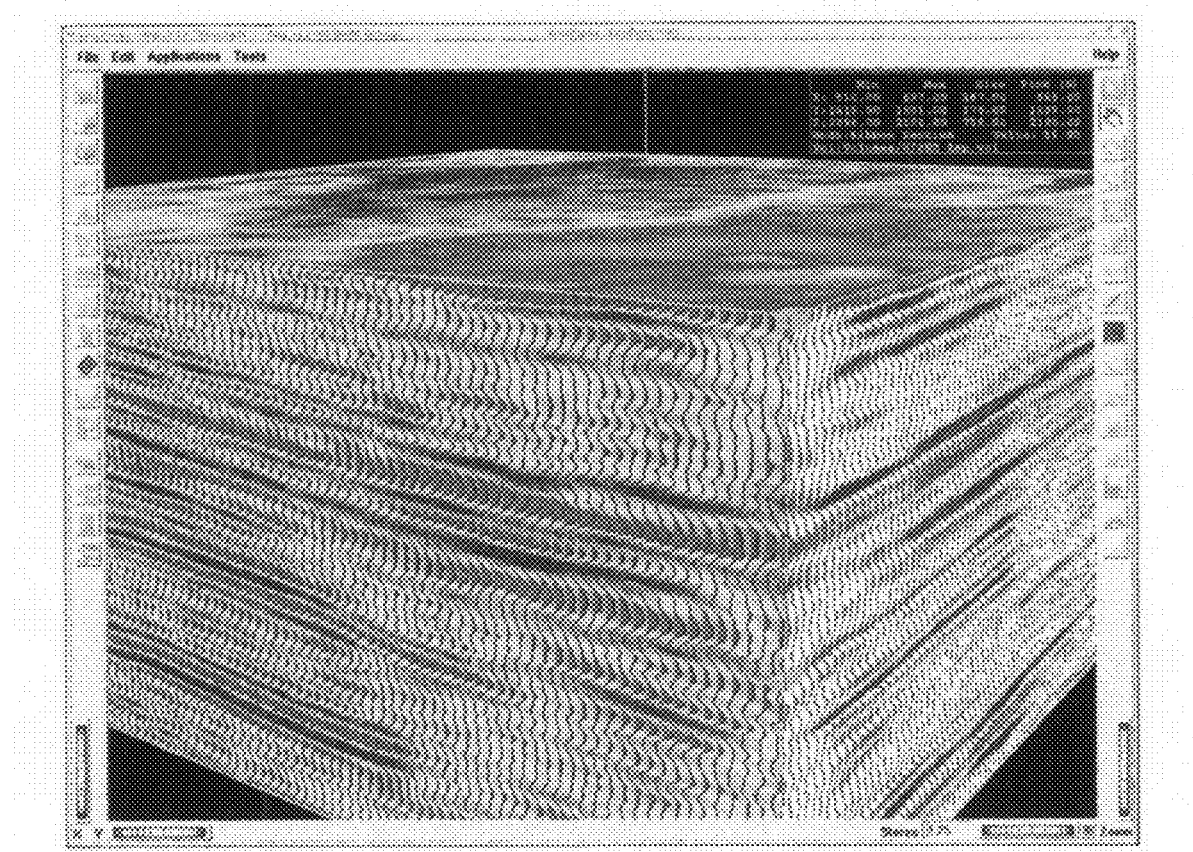
FIG. 14 is a color drawing illustrating a combined three-dimensional wiggle and variable-density display with positive fill and negative fill.

FIG. 7-14 illustrate various three-dimensional images of a sampling probe generated using Geoprobe® and the routine 300. FIG. 7, for example, illustrates the results of the routine 300 applied to an amplitude volume comprising a three-dimensional data set of voxels, wherein the different colors represent different amplitude values for each voxel. FIGS. 8 and 9 illustrate the results of the routine 300 applied to a three-dimensional volume of seismic-data traces representing a waveform volume, wherein each seismic-data trace is represented by a black wiggle, the background is represented by the color white, the positive fill is represented by various shades of the color red and the negative fill is represented by various shades of the color blue. FIG. 10, likes FIGS. 8 and 9, illustrates the results of the routine 300 applied to a three-dimensional volume of seismic-data traces representing a waveform volume; however, one face of the image is not color filled but includes a horizontal blue horizon intersection representing an interpreted feature defined by or more of the seismic-data traces. FIG. 11 is similar to FIG. 10 except that the face of the sampling probe containing the blue horizon intersection has been color filled with positive fill and negative fill. FIG. 12 is similar to FIG. 11 except that the face containing the blue horizon intersection has been color filled with just positive fill. FIG. 13 is also similar to FIG. 11 except that the face containing the blue horizon intersection has been color filled with just negative fill. FIG. 14 illustrates the results of the routine 300 applied to a three-dimensional volume of seismic-data traces and a three-dimensional volume of voxels, which have been combined into a single three-dimensional image representing a sampling probe.

As illustrated by the results of the routine 300 in FIG. 7-14, the system and methods of the present invention therefore, improve the ability to recognize and process amplitude variation patterns, and other attribute anomalies, indicative of hydrocarbon resources. Beyond the generation of wiggle displays, one can envision a multitude of useful multidata synthetic images that can be generated using the present invention. Multi-attribute displays, which must currently be computed on the CPU, saved to disk, and then rendered can, instead, be rendered directly on the GPU, thereby radically reducing the cycle-time necessary to gain insight into volumetric data using multiple attributes.

Because the systems and methods described herein may be used to selectively and interactively analyze various types of seismic-data traces, they may be particularly useful for analyzing medical data or geophysical data, however, may also find utility for analyzing and interpreting any other type of waveform data.

While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof.

The invention claimed is:

1. A method for imaging a three-dimensional volume of seismic-data traces representing a waveform volume, which comprises:
   retrieving texture coordinates (s, t) for a pixel in a display device that intersects the waveform volume;
   computing an amplitude for a first trace at pixel texture coordinate (t) representing a first trace amplitude;
   computing a texture coordinate (S) for the first trace amplitude;
   coloring the pixel with a preset trace color if the first trace amplitude texture coordinate (S) is equal to the pixel texture coordinate (s);
   computing an amplitude for a second trace at pixel texture coordinate (t) representing a second trace amplitude;
   computing a texture coordinate (S') for the second trace amplitude;
   coloring the pixel with the preset trace color if the second trace amplitude texture coordinate (S') is equal to the pixel texture coordinate (s);
   coloring the pixel with a preset background color if the second trace amplitude texture coordinate (S') is greater than the pixel texture coordinate (s); and
   modifying the pixel texture coordinates (s, t) and repeating the computing and coloring steps if an iteration count is less than a desired seismic-data trace overlap.

2. The method of claim 1, wherein computing the first trace amplitude and the second trace amplitude comprise computing an index value for each trace and each sample adjacent the pixel texture coordinates.

3. The method of claim 1, further comprising:
   coloring the pixel with a preset positive fill color if the first trace amplitude texture coordinate (S) is greater than the pixel texture coordinate (s); and
   coloring the pixel with a preset negative fill color if the second trace amplitude texture coordinate (S') is less than the pixel texture coordinate (s).

4. The method of claim 3, wherein coloring the pixel comprises applying the trace color, the background color, the positive fill color or the negative fill color over a current color of the pixel.

5. The method of claim 1, wherein the background color is transparent or white.

6. The method of claim 1, further comprising repeating each step for each pixel in the display device that intersects the waveform volume.

7. The method of claim 1, further comprising displaying at least a portion of the waveform volume in a two-dimensional or three-dimensional image.

8. The method of claim 7, further comprising combining the two-dimensional or three-dimensional image of the waveform volume with a two-dimensional or three-dimensional image of a variable density volume, which is defined by a data-set of voxels wherein each voxel is expressed in the form of x, y, z, data value.

9. The method of claim 8, wherein the data value for each voxel is represented by an amplitude.

10. The method of claim 1, wherein the waveform volume comprises geophysical data.

11. The method of claim 1, further comprising:
   interpreting a feature defined by one or more of the seismic-data traces; and
   displaying an image of the interpreted feature.

12. A non-transitory computer readable medium tangibly carrying computer executable instructions for imaging a three-dimensional volume of seismic-data traces representing a waveform volume, the instructions being executable to implement:
   retrieving texture coordinates (s, t) for a pixel in a display device that intersects the waveform volume;
   computing an amplitude for a first trace at pixel texture coordinate (t) representing a first trace amplitude;
   computing a texture coordinate (S) for the first trace amplitude;
   coloring the pixel with a preset trace color if the first trace amplitude texture coordinate (S) is equal to the pixel texture coordinate (s);
   computing an amplitude for a second trace at pixel texture coordinate (t) representing a second trace amplitude;
   computing a texture coordinate (S') for the second trace amplitude;
   coloring the pixel with the preset trace color if the second trace amplitude texture coordinate (S') is equal to the pixel texture coordinate (s);

coloring the pixel with a preset background color if the second trace amplitude texture coordinate (S') is greater than the pixel texture coordinate (s); and modifying the pixel texture coordinates (s, t) and repeating the computing and coloring steps if an iteration count is less than a desired seismic-data trace overlap.

13. The computer readable medium of claim 12, wherein computing the first trace amplitude and the second trace amplitude comprise computing an index value for each trace and each sample adjacent the pixel texture coordinates.

14. The computer readable medium of claim 12, further comprising:

coloring the pixel with a preset positive fill color if the first trace amplitude texture coordinate (S) is greater than the pixel texture coordinate (s); and coloring the pixel with a preset negative fill color if the second trace amplitude texture coordinate (S') is less than the pixel texture coordinate (s).

15. The computer readable medium of claim 14, wherein coloring the pixel comprises applying the trace color, the background color, the positive fill color or the negative fill color over a current color of the pixel.

16. The computer readable medium of claim 12, wherein the background color is transparent or white.

17. The computer readable medium of claim 12, further comprising repeating each step for each pixel in the display device that intersects the waveform volume.

18. The computer readable medium of claim 12, further comprising displaying at least a portion of the waveform volume in a two-dimensional or three-dimensional image.

19. The computer readable medium of claim 18, further comprising combining the two-dimensional or three-dimensional image of the waveform volume with a two-dimensional or three-dimensional image of a variable density volume, which is defined by a data-set of voxels wherein each voxel is expressed in the form of x, y, z, data value.

20. The computer readable medium of claim 19, wherein the data value for each voxel is represented by an amplitude.

21. The computer readable medium of claim 12, wherein the waveform volume comprises geophysical data.

22. The computer readable medium of claim 12, further comprising:

interpreting a feature defined by one or more of the seismic-data traces; and displaying an image of the interpreted feature.

* * * * *